(12) United States Patent
Wroblewski et al.

(10) Patent No.: US 8,917,505 B2
(45) Date of Patent: Dec. 23, 2014

(54) POSITIONABLE STAND FOR COMPUTING DEVICE

(75) Inventors: Alexander Wroblewski, San Jose, CA (US); Richard Gioscia, Santa Clara, CA (US); Philip Bryan, Menlo Park, CA (US); Sean Eugene Daley, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 66 days.

(21) Appl. No.: 13/563,301

(22) Filed: Jul. 31, 2012

(65) Prior Publication Data

US 2014/0036430 A1   Feb. 6, 2014

(51) Int. Cl.
*G06F 1/16*   (2006.01)
*H05K 5/00*   (2006.01)
*H05K 7/00*   (2006.01)

(52) U.S. Cl.
USPC ............ 361/679.56; 361/679.21; 361/679.26; 361/679.3; 361/679.55

(58) Field of Classification Search
CPC ... G06F 1/1613; G06F 1/1622; G06F 1/1626; G06F 1/1628
USPC ............... 361/679.21, 679.26, 679.3, 679.55, 361/679.56
See application file for complete search history.

(56) References Cited

U.S. PATENT DOCUMENTS

| | | | |
|---|---|---|---|
| 6,256,193 B1* | 7/2001 | Janik et al. | 361/679.59 |
| 6,462,942 B1 | 10/2002 | McClendon et al. | |
| 2003/0160138 A1* | 8/2003 | Rawlings et al. | 248/176.3 |
| 2011/0062304 A1 | 3/2011 | Hsieh et al. | |
| 2011/0279962 A1* | 11/2011 | Chiang et al. | 361/679.21 |

OTHER PUBLICATIONS

Hall, C., "Shuttle X Vision X5000T All-in-One PC Review," available at URL < http://www.pocket-lint.com/review/4507/shuttle-x5000t-allinone-pc-review >, web page, published Dec. 11, 2009.
Seghers, A., "Sony VGC JS1E All-in-One PC Review," available at URL < http://www.trustedreviews.com/sony-vgc-js1e-all-in-one-pc_Desktop-PC_review > web page, published Dec. 11, 2011.

* cited by examiner

*Primary Examiner* — Anthony Haughton

(57) ABSTRACT

A stand assembly for a computing device is provided. The stand assembly includes a stand and a coupling mechanism to couple the stand to a rear face of the computing device. The coupling mechanism is structured to enable the stand to be moved under bias into multiple positions, including a first position in which the stand extends outward from the rear face at a first angle and retains the computing device upright at a first orientation, and a second position in which the stand extends outward from the rear face at a second angle and retains the computing device upright at a second orientation. The coupling mechanism is structured to return the stand, from at least each of the first position and the second position, into a closed position that abuts the rear face of the computing device when the coupling mechanism is relaxed.

16 Claims, 4 Drawing Sheets

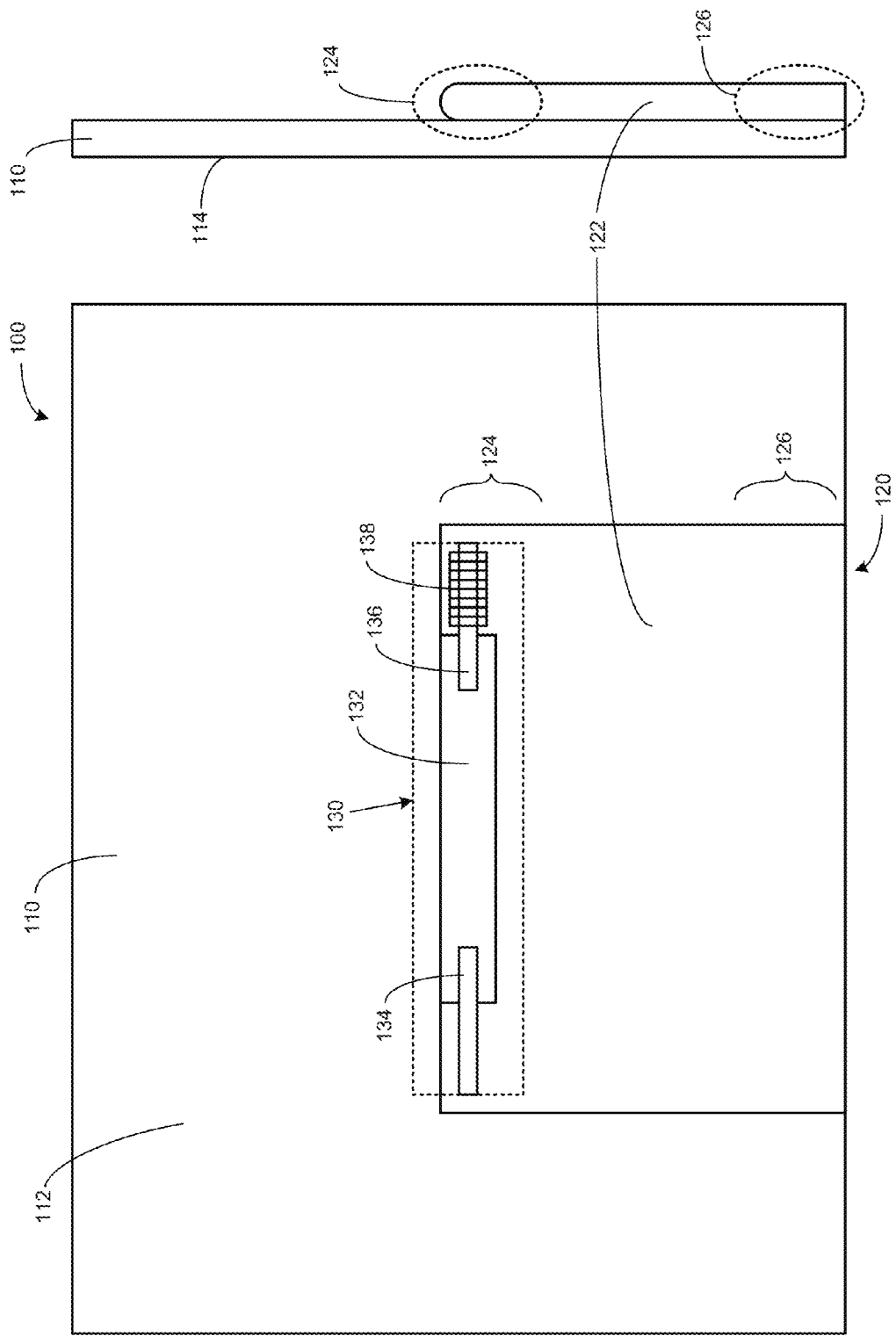

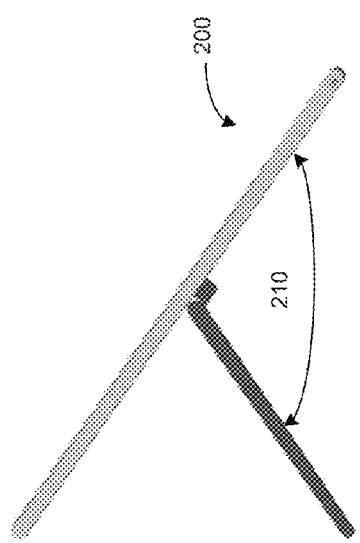
FIG. 2A
FIG. 2B
FIG. 2C
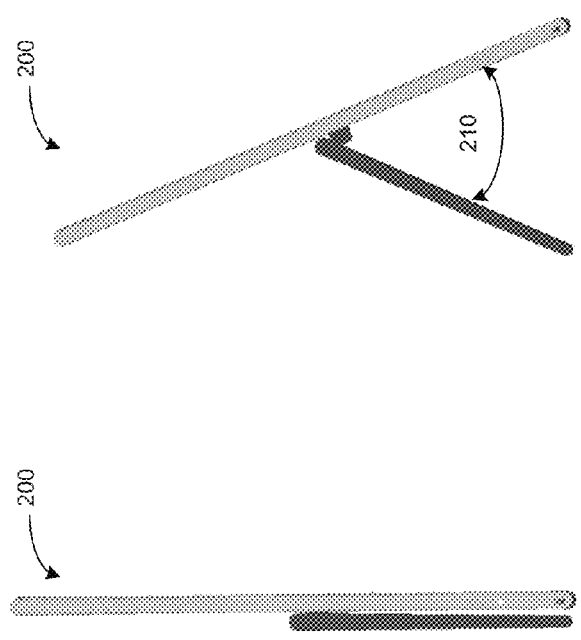
FIG. 2D
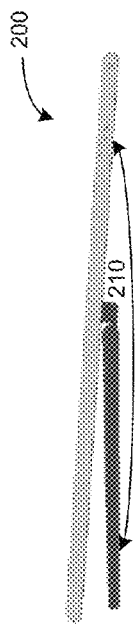
FIG. 2E
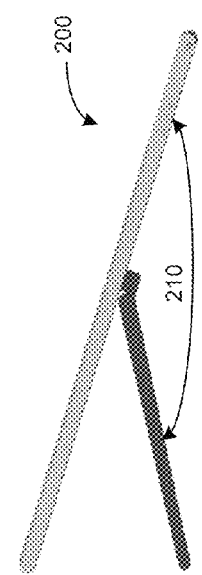

POSITIONABLE STAND FOR COMPUTING DEVICE

BACKGROUND OF THE INVENTION

Tablet computing devices can be accessorized by a multitude of devices. For example, users can equip most tablet devices with stands, docking stations, covers and other accessories. As tablet devices have display-dominant form factors, stands serve to orient the display device in a manner that facilitates viewability of the device's display.

BRIEF DESCRIPTION OF THE DRAWINGS

FIGS. 1A-1C illustrate example computing devices having a self-retracting stand.

FIGS. 2A-2E illustrate an example computing device with a self-retracting stand in a variety of different positions.

DETAILED DESCRIPTION

Figure 1C:
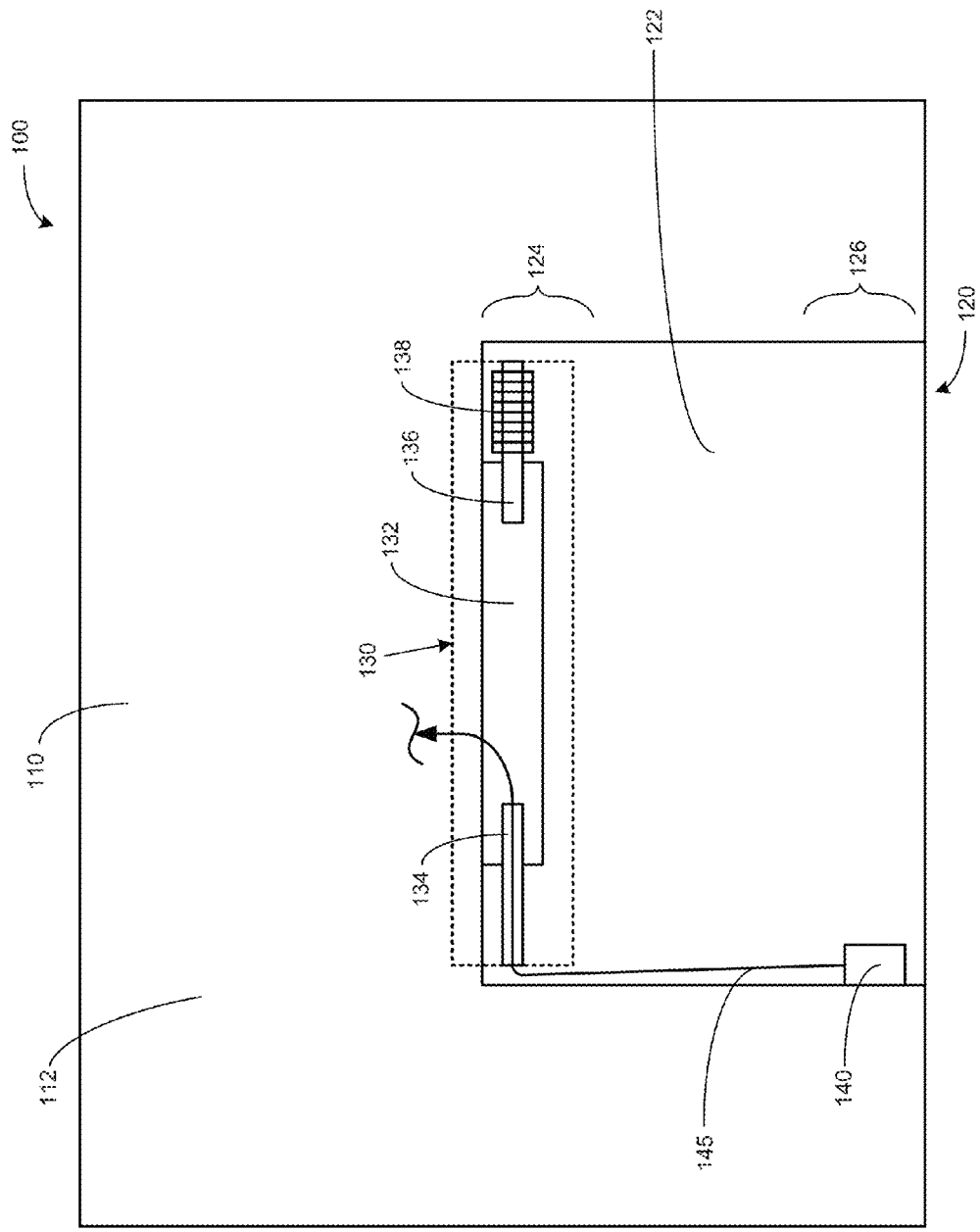

Embodiments described herein provide for a computing device that includes a stand assembly that enables the stand to be moved under bias into multiple positions. Embodiments further provide a stand that is retractable from multiple positions to a closed position when the hinge assembly is relaxed.

In an embodiment, a stand assembly can include a stand and a coupling mechanism to couple the stand to a rear face of a computing device. The hinge assembly is structured to enable the stand to be moved under bias into multiple positions, including a first position in which the stand extends outward from the rear face at a first angle and retains the computing device upright at a first orientation, and a second position in which the stand extends outward from the rear face at a second angle and retains the computing device upright at a second orientation. In one example, the stand can be positionable to orient the front face between 90 degrees and 170 degrees relative to an underlying surface for the stand.

Still further, the hinge assembly enables the stand to pivot away from the rear face of the computing device when a force is applied by a user. When the stand is pivoted away from the rear face of the computing device and positioned on an underlying surface, the front face of the computing device can be positioned in at least a partially upright position. By positioning the front face of the computing device in at least a partially upright position, a user is able to interact with the computing device without having to hold the device in one or both hands.

In some embodiments, the hinge assembly can include one or more friction hinges to enable the stand to be pivoted away from the rear face. The one or more friction hinges requires the a user to apply an amount of force to move the stand away from the rear face. The hinge assembly can also include a torsion spring that is coupled to one or more friction hinges so that the stand can automatically retract to a starting position when the stand is not under bias.

As described herein, a computing device can include a laptop computer, a tablet computing device, a smart phone, or an all-in-one computing device. As used herein, the term "substantially" means at least 90% of a stated reference, value, or point of comparison.

FIGS. 1A-1B illustrate an example computing device having a self-retracting stand. More specifically, FIG. 1A illustrates a view of a rear face of a computing device, while FIG. 1B illustrates a side view of the computing device. In one implementation, a computing device 100 can include a main housing 110 and a stand assembly 120. The main housing 110 can house a plurality of components for the computing device 100 (e.g., a touch-screen display, one or more processors, one or more radio components, memory resources, batteries, etc.). The main housing 110 can also have a rear face 112 and a front face 114.

In some variations, the computing device 100 can be a tablet computing device and/or an all-in-one computing device. Accordingly, the main housing 110 of the computing device 100 can be dimensioned so that the majority of the portions of the rear face 112 and/or the front face 114 (e.g., where the touch-screen display and/or one or more input mechanisms is provided) is substantially flat in shape. The stand assembly 120 can be provided on the rear face 112 of the main housing 110 and can be pivotable to position and orient the computing device in multiple orientations. Depending on different implementations, the stand assembly 120 can be an accessory that can be coupled to (and also detachable from) the rear face 112 of the computing device 100 via a coupling mechanism, or can be physically mounted or integrated with the rear face 112 of the computing device 100. For example, the stand assembly 120 can include a coupling mechanism (e.g., as part of a first portion 132 of a hinge assembly 130) to couple the stand 122 of the stand assembly 120 to the computing device.

The stand assembly 120 can include a stand (or stand body) 122 and a hinge assembly 130. For illustrative purposes, the stand 122 can be described as having an upper region 124 and a lower region 126. The hinge assembly 130, for example, can be provided near or at the upper region 124 of the stand 122 to enable the lower region 126 of the stand 122 to pivot away from the rear face 112 of the main housing 110. For example, the stand 122 can pivot about the hinge assembly 130 so that when the stand 122 is positioned in an open position, the upper region 124 of the stand 122 is closer than the lower region 126 of the stand 122 to the rear face 112 of the main housing 110. According to different variations, the shape of the stand 122 can be different than what is illustrated in FIGS. 1A-1B. For example, the stand 122 can have a lower region 126 that is wider than what is illustrated in FIG. 1A or can be as wide as entire the width of the main housing 110. The stand 122 can also be shaped as a trapezoid, triangle, or other shapes.

The hinge assembly 130 can include one or more hinges, such as a first friction hinge 134 and a second friction hinge 136. The first friction hinge 134 and the second friction hinge 136 can substantially aligned along an axis so that the first portion 132 of the hinge assembly 130 remains stationary (e.g., coupled to the rear face 112) while the stand 122 pivots about the axis. The number and the types of hinges that are provided in the hinge assembly 130 can vary depending on variations (e.g., one, two, three, or four or more). For example, a friction hinge can require a particular amount of force to pivot one portion of the friction hinge relative to the other portion. If it is preferred to require more force by a user to move the stand 122 away from the rear face 110, additional friction hinges (and/or different types of friction hinges) can be provided in the hinge assembly 130.

For example, the stand 122 can require a relatively large amount of torque to open (e.g., move away from the rear face 112 of the main housing 110), which can allow for a stable and upright operating position for the computing device 100. Other benefits for requiring a large amount of force include ensuring that the stand 122 remain closed (e.g., remain in the starting or closed position where the stand 122 is positioned against or abut the rear face 112) when the user is holding the computing device 100, transporting the computing device 100, or placing the computing device 100 on a surface.

The hinge assembly 130 can also include a biasing mechanism, such as one or more torsion springs (or other springs), so that the stand 122 can automatically retract back to the closed position (e.g., where the stand 122 is positioned against the rear face 112 of the main housing 110 as illustrated in FIG. 1B) when no force (or weight) of the main housing 110 is applied to the stand 122. For example, when the user applies a force to move the stand 122 away from the rear face 112 of the main housing 110 and places the computing device 100 on a surface, the position of the computing device 100 can be maintained as a result of the force or the weight of the main housing 110 (e.g., the stand 122 remains stationary because it is under bias due to the force of the main housing 110). However, if the user lifts the computing device 100 off the surface, e.g., the hinge assembly 130 is relaxed or in a relaxed state so that it is not under bias, the stand 122 can slowly retract back to its closed position. In this manner, the user can easily pick up and move the computing device 100 (after using the computing device 100 in an upright position, for example) without having to manually close the stand 122 or worry about the stand 122 getting damaged (e.g., by getting caught in something or by moving or bending it in a way it should not move in).

For example, the biasing mechanism of the hinge assembly 130 can be a torsion spring 138 that can be coupled to or be incorporated with one of the friction hinges (e.g., the second friction hinge 136). The torsion spring 138 can provide enough bias (e.g., based on the thickness of the torsion spring wire and/or the number of turns/twists) when the stand 122 is in an open position to cause the stand 122 to slowly retract until the stand 122 is substantially parallel to the rear face 112 of the main housing 110 (e.g., retract back to its closed position) when no force is applied to the stand 122 from the main housing 110. At the same time, the torsion spring 138 does not provide sufficient bias to cause the stand 122 to retract to its closed position when the stand 122 is positioned away from the rear face 112 of the main housing 110 and the computing device 100 is placed in at least an upright position on an underlying surface.

According to one or more implementations, the stand assembly 120 can also be mounted or coupled to a mid-region of the rear face 112. For example, the hinge assembly 130 can be coupled to the mid-region of the rear face 112 so that the first portion 132 of the hinge assembly 130 remains stationary and fixed at the mid-region of the rear face 112 while the stand 122 is capable of pivoting. The first portion 132 of the hinge assembly 130 can include a coupling mechanism to couple the stand assembly 120 to the rear face 112 using one or more bolts or screws or magnets (and/or other retaining means, such as adhesives or glue). In one variation, the first portion 132 of the hinge assembly 130 can be an extended portion of the rear face 112. In other variations, the stand assembly 120 can be an accessory device that, when coupled to the computing device 100, can position the hinge assembly 130 at the mid-region of the rear face 112.

FIG. 1C illustrates another example of a computing device having a self-retracting stand. The computing device illustrated in FIG. 1C can include similar features as the computing device described with respect to FIGS. 1A-1B. In FIG. 1C, the stand assembly 120 is coupled to and/or integrated with the rear face 112 of the main housing 110. The stand assembly 120 can include one or more ports 140, such as a communication port for exchanging data with another device or a power port for receiving power for charging the computing device 100. For example, a port 140 can be provided on a side surface of the stand 122. The port 140 can also be provided in the lower region 126 of the stand. The stand 122 can include one or more wires or cables 145 that run through the stand 122 as well as the hinge assembly 130 in order to electrically couple the port 140 to one or more internal components of the computing device 100 (e.g., components that are housed in the main housing 110 of the computing device 100). For example, the first friction hinge 134 can include a shaft, where the one or more wires or cables 145 can be run or threaded through.

In some cases, it may be beneficial for the first friction hinge 134 to have a shorter shaft than the second friction hinge 136, for the one or more wires 145 to be threaded through. In situations where the shaft lengths are different between the hinges 134, 136, different hinges can be used to provide for a different amount of friction at each hinge. For example, even though the shaft lengths are different, it may be preferred to have the hinge element 130 require a specific overall amount of force in order for the stand 120 to be pivoted away from the rear face 112. Accordingly, the amount of friction provided by the first friction hinge 134 can be different than the second friction hinge 136, but as a combination, the amount of force can equal the particular overall amount of force to move the stand 120.

FIGS. 2A-2E illustrate an example computing device with a self-retracting stand in a variety of different positions. The computing device 200 can be oriented in the different positions illustrated by FIGS. 2A-2E by moving (e.g., pivoting) the stand away from the rear face of the main housing or closer to the rear face of the main housing. In the various positions described, the stand can provide a stable operating position even when the user interacts with the touch-sensitive display provided on the front face of the computing device 200 (e.g., the user can tap on the display when operating the computing device 200, but the positions remain stable). In addition, the stand retains the computing device 200 in an upright corresponding position in each of the FIGS. 2A-2E.

In FIG. 2A, the computing device 200 is positioned so that it is substantially 90 degrees relative to an underlying surface on which the computing device 200 is positioned on (e.g., the front face of the computing device 200 is substantially vertical). In this upright orientation, the stand is positioned to be very close to the rear face of the main housing, but not in its starting or closed position (e.g., where the stand is positioned against or abut the rear face as illustrated in FIG. 1B).

FIG. 2B illustrates the computing device 200 that is positioned in a different position, where the stand is moved and positioned to be further away from the rear face of the main housing than FIG. 2A. In this position, the stand extends outward from the rear face at a stand angle 210 (i.e., the angle of the stand relative to the rear face of the main housing) and retains the computing device 200 in an upright position. The stand angle 210 enables the front face of the computing device 200 to be approximately 110 degrees relative to the underlying surface (somewhere between 100 degrees and 120 degrees, for example). The position, as illustrated in FIG. 2B, can be a display mode, for example, to provide a good angle for a user in viewing the front face of the computing device 200. Such a position can be suitable for operations where the user is not frequently providing user input (e.g., reading content or watching a video that is presented on the display). However, when the user provides inputs on the touch-sensitive display, the orientation of the computing device 200 in FIG. 2B provides and maintains stability. This can be attributed to, for example, the stand assembly being mounted in a mid-region of the rear face of the main housing.

FIG. 2C illustrates the computing device 200 that is positioned in a different upright position, where the stand angle 210 is much greater than the stand angle illustrated in FIG. 2B. In the position illustrated in FIG. 2C, the front face of the computing device 200 is approximately 135 degrees relative to the underlying surface (somewhere between 120 degrees and 140 degrees, for example). This orientation can be a typing mode or drawing mode, for example, which can provide a good angle for a user to view the front face of the computing device 200 and provide user inputs on the touch-sensitive display. Such a position can be suitable for operations where the user is frequently providing user input on the display (e.g., playing a game, typing on a keyboard that is displayed on the touch-sensitive display). The stand assembly provides stability to the computing device 200 to prevent the computing device 200 from moving, jiggling, or wobbling, for example, when the user provides inputs on the display.

FIGS. 2D and 2E illustrate additional possible positions of the computing device 200. In FIG. 2D, the stand is moved under bias to a position, in which the stand extends outward from the rear face of the computing device 200 at a stand angle 210, that is greater than the stand angle of the stand positions in FIGS. 2A-2C. Similarly, in FIG. 2D, the stand is moved under bias to another position, in which the stand extends outward from the rear face of the computing device at a stand angle 210, that is greater than the stand angle of the stand positions in FIGS. 2A-2D. As illustrated in FIGS. 2D and 2E, the computing device 200 can be positioned to be approximately 160 degrees and close to 180 degrees (e.g., 170 degrees), respectively, relative to the underlying surface. The stand can be pivoted, as illustrated in FIGS. 2A-2E, anywhere from the starting position (where the stand is positioned against the rear face as illustrated in FIGS. 1A-1B) to the position as illustrated in FIG. 2E. In this manner, the stand can be positionable to orient the computing device 200, so that the front face of the computing device 200 can be oriented in multiple possible orientations (e.g., from approximately 90 degrees to 170 degrees).

In each of the orientations of the computing device 200, the force or the weight of the main housing of the computing device 200 applied on the stand assembly causes the stand (as well as the computing device 200 itself) to remain stationary (e.g., because the stand is under bias due to the force of the main housing of the computing device 200). When the user lifts the computing device 200 off the underlying surface (e.g., remove the bias from the force or weight of the main housing), the stand can retract back from each of the positions illustrated in FIGS. 2A-2E to its closed position.

Figure 3C:
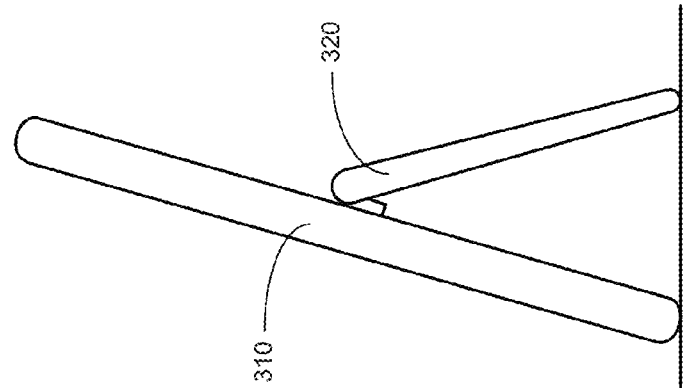
FIGS. 3A-3C illustrate an example computing device with a self-retracting stand that is changing positions.
Figure 3B:
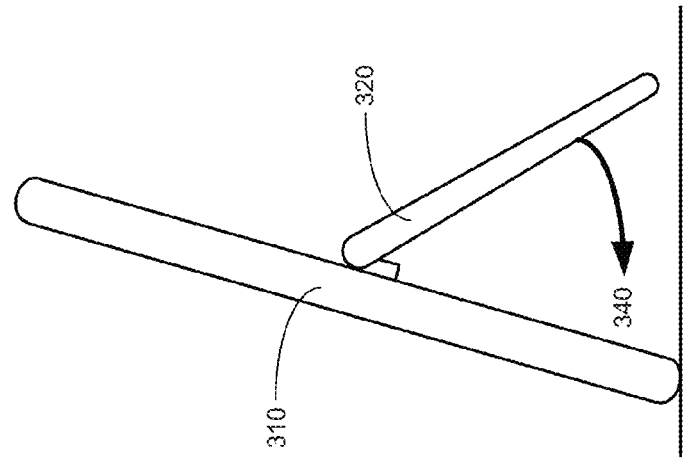
Figure 3A:
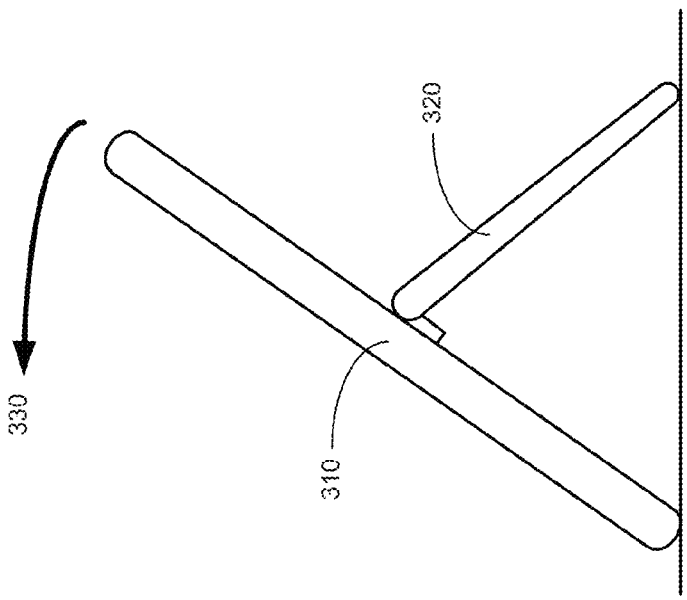

FIGS. 3A-3C illustrate an example computing device with a self-retracting stand that is changing positions. The computing device illustrated in FIGS. 3A-3C can include similar features as the computing device described with respect to FIGS. 1A-2E.

In FIG. 3A, the computing device is resting on an underlying surface in a first partially upright orientation. The stand 320 is positioned to stably hold the main housing 310 in the described orientation. As discussed, the hinge assembly may require a specific amount of force (e.g., as applied by the user) to move the stand 320 away from the rear face of the main housing 310. In addition, the weight of the main housing 310 provides a bias (e.g., in a downward direction) to also cause the stand 320 to remain in the open position (e.g., prevent the stand 320 from retracting to the starting position).

While operating the computing device, in some instances, the user may want to change the angle in which he or she is viewing the front face of the computing device. For example, the user may want to change the viewing angle so that the front face of the main housing 310 is approximately 110 degrees relative to the underlying surface instead of approximately 130 degrees, as positioned in FIG. 3A. In this situation, the user can hold the upper region of the main housing 310 and bring the upper region closer to the user in the direction 330.

When the user holds and brings the upper region of the main housing 310 closer to the user in the direction 330, the stand 320 is no longer under bias from the force or weight of the main housing 310. As a result, as illustrated in FIG. 3B, once the bias from the force or weight of the main housing 310 is removed (e.g., so that the hinge assembly is relaxed), the stand 310 can begin to retract back towards the closed position, i.e., in the direction 340.

The stand 320 can continue to retract back towards the closed position in the direction 340 until (1) the foot or bottom of the stand 320 makes contact with the underlying surface, or (2) the user releases the main housing 310 so that the main housing 310 falls back on the stand 320, and causes the stand 320 to rest on the underlying surface. The stand 320 can then maintain its position, as illustrated in FIG. 3C, so that the computing device is positioned at least in a partially upright position. The front face of the main housing 310 is now approximately 110 degrees relative to the underlying surface. If the user picks up the computing device in its entirety, the stand 320 can continue to retract back in the direction 340 until it reaches its starting position (e.g., as illustrated in FIGS. 1A-1B).

As an alternative or an addition, different types of hinges can be provided as part of the hinge assembly. For example, a two-way torque hinge can be used instead of two friction hinges, as described in FIGS. 1A-1B. A two-way torque hinge can enable the stand to be easily moved back to its starting position (e.g., so that the stand does not automatically retract). Instead, the two-way torque hinge can enable the closing torque amount to be much less than the opening torque amount, so that it is easier for the user to close the stand (e.g., move the stand closer to the rear face of the main housing of the computing device) than to open the stand (e.g., move the stand further away from the rear face). The torque amount required to open the stand (i.e., in order to orient the computing device in a partially upright position) can enable the stand to stably orient the computing device when rested on an underlying surface. Other benefits include enabling the user to easily close the stand (or move the stand to the starting position) when transporting or putting away the computing device.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A stand assembly comprising:
   a stand;
   a coupling mechanism to couple the stand to a rear face of a computing device; and
   a hinge assembly being structured to enable the stand to be moved under bias into multiple positions, including a first position in which the stand extends outward from the rear face at a first angle and retains the computing device upright at a first orientation, and a second position in which the stand extends outward from the rear face at a second angle and retains the computing device upright at a second orientation;
   wherein the hinge assembly is structured to automatically return the stand, from any one of the first position or the second position, to a closed position in which the stand abuts the rear face of the computing device when the hinge assembly is relaxed, the hinge assembly being relaxed when a weight of the computing device is removed from the stand;
   wherein the hinge assembly includes a first portion that is coupled to the coupling mechanism and that remains stationary when the stand is moved into any one of the multiple positions; and
   wherein the hinge assembly includes a first friction hinge and a second friction hinge that is aligned along an axis to enable the stand to pivot away from the rear face about the axis, wherein a first portion of the first friction hinge and a first portion of the second friction hinge is provided within or as part of the first portion of the hinge assembly and a second portion of the first friction hinge and a second portion of the second friction hinge is provided within or as part of the stand.

2. The stand assembly of claim 1, wherein the hinge assembly enables the stand to move from the closed position to a position greater than 90 degrees relative to the rear face of the computing device.

3. The stand assembly of claim 1, wherein the stand is positionable to orient a front face of the computing device between 90 and 170 degrees relative to an underlying surface for the stand.

4. The stand assembly of claim 1, wherein the coupling mechanism enables the stand assembly to be attachable and detachable from the rear face.

5. The stand assembly of claim 1, wherein the coupling mechanism integrally couples the stand to the rear face of a computing device.

6. The stand assembly of claim 1, wherein the hinge assembly includes a torsion spring that is coupled to at least one of the first friction hinge or the second friction hinge.

7. A computing device comprising:
   a main housing having a front face and a rear face; and
   a stand assembly coupled to the rear face of the main housing, the stand assembly including a stand and a hinge assembly that includes a coupling mechanism to couple the stand assembly to the main housing, the hinge assembly being structured to enable the stand to be moved under bias into multiple positions, including a first position in which the stand extends outward from the rear face at a first angle and retains the computing device upright at a first orientation, and a second position in which the stand extends outward from the rear face at a second angle and retains the computing device upright at a second orientation;
   wherein the hinge assembly is structured to automatically return the stand, from any one of the first position or the second position, to a closed position in which the stand abuts the rear face of the computing device when the hinge assembly is relaxed, the hinge assembly being relaxed when a weight of the main housing of the computing device is removed from the stand;
   wherein the hinge assembly includes a first portion that is coupled to the coupling mechanism and that remains stationary when the stand is moved into any one of the multiple positions; and
   wherein the hinge assembly includes a first friction hinge and a second friction hinge that is aligned along an axis to enable the stand to pivot away from the rear face about the axis, wherein a first portion of the first friction hinge and a first portion of the second friction hinge is provided within or as part of the first portion of the hinge assembly and a second portion of the first friction hinge and a second portion of the second friction hinge is provided within or as part of the stand.

8. The computing device of claim 7, wherein the stand is positionable to orient the front face between 90 and 170 degrees relative to an underlying surface for the stand.

9. The computing device of claim 7, wherein the hinge assembly enables the stand to move from the closed position to a position greater than 90 degrees relative to the rear face of the computing device.

10. The computing device of claim 7, wherein the stand is positioned in a mid-region of the rear face.

11. The computing device of claim 7, wherein the hinge assembly includes a torsion spring that is coupled to at least one of the first friction hinge or the second friction hinge.

12. The computing device of claim 11, wherein the stand includes one or more connector interfaces for coupling the computing device to one or more other connectors, and wherein the stand includes one or more connecting wires coupled to the one or more connector interfaces to connect the one or more connector interfaces to internal components of the computing device stored in the main housing, the one or more connecting wires being threaded through a shaft of the at least one friction hinge of the hinge assembly.

13. A computing device assembly comprising:
   a computing device; and
   a stand assembly comprising:
      a stand;
      a coupling mechanism to couple the stand to a rear face of a computing device; and
      a hinge assembly being structured to enable the stand to be moved under bias into multiple positions, including a first position in which the stand extends outward from the rear face at a first angle and retains the computing device upright at a first orientation, and a second position in which the stand extends outward from the rear face at a second angle and retains the computing device upright at a second orientation;
      wherein the hinge assembly is structured to automatically return the stand, from any one of the first position or the second position, to a closed position in which the stand abuts the rear face of the computing device when the hinge assembly is relaxed, the hinge assembly being relaxed when a weight of the computing device is removed from the stand;
      wherein the hinge assembly includes a first portion that is coupled to the coupling mechanism and that remains stationary when the stand is moved into any one of the multiple positions; and
      wherein the hinge assembly includes a first friction hinge and a second friction hinge that is aligned along an axis to enable the stand to pivot away from the rear face about the axis, wherein a first portion of the first friction hinge and a first portion of the second friction hinge is provided within or as part of the first portion of the hinge assembly and a second portion of the first friction hinge and a second portion of the second friction hinge is provided within or as part of the stand.

14. The computing device assembly of claim 13, wherein the hinge assembly includes a torsion spring coupled to the second friction hinge.

15. The computing device assembly of claim 13, wherein the computing device is a tablet-form computing device.

16. The computing device assembly of claim 13, wherein the hinge assembly enables the stand to move from the closed position to a position greater than 90 degrees relative to the rear face of the computing device.

* * * * *